July 22, 1941.                  J. A. PALMER                  2,249,850
                 FLUID PRESSURE CYLINDER LOCKING MECHANISM
                         Filed June 18, 1940          2 Sheets-Sheet 1
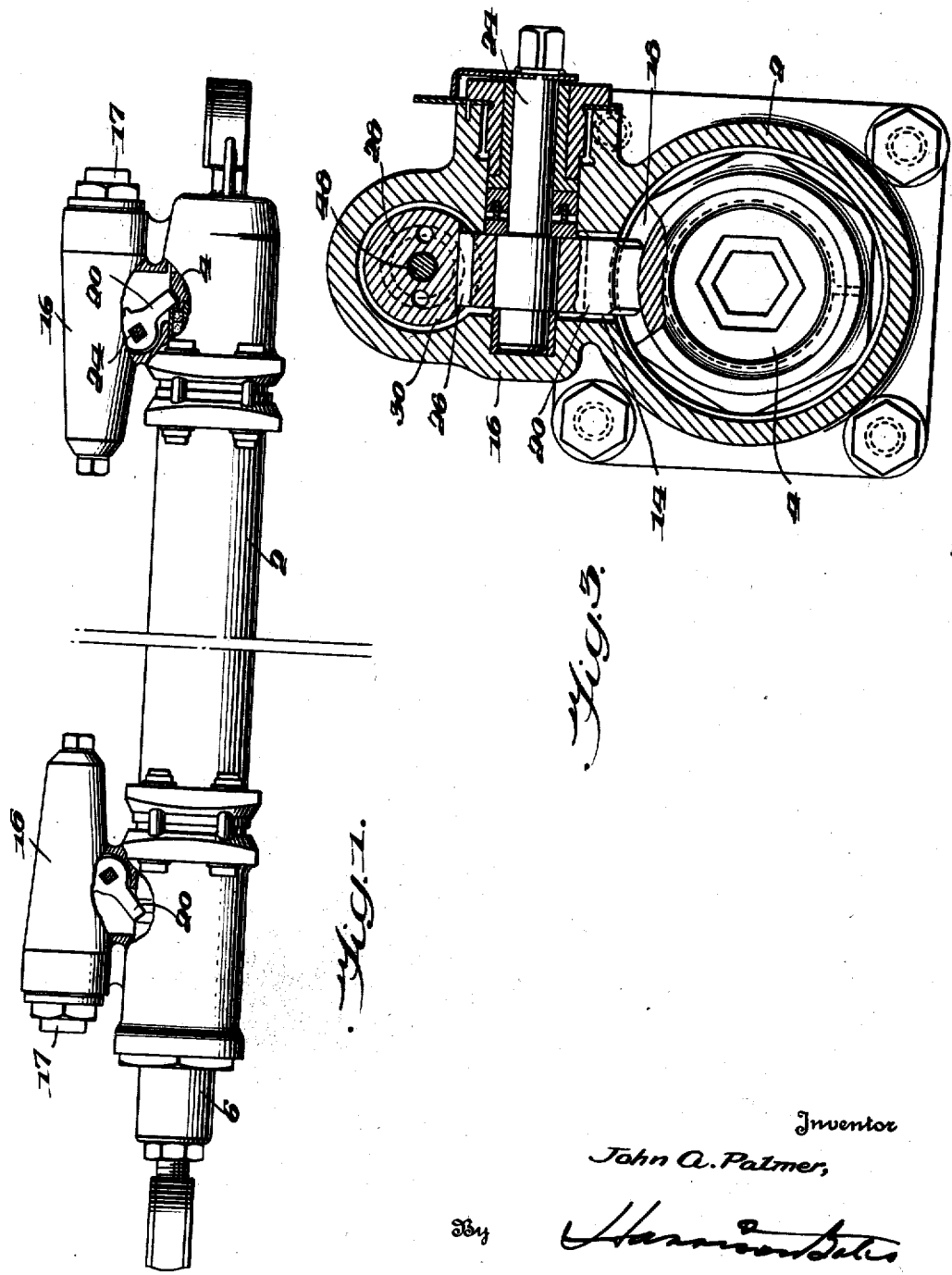
Inventor
John A. Palmer,
By
           Attorney

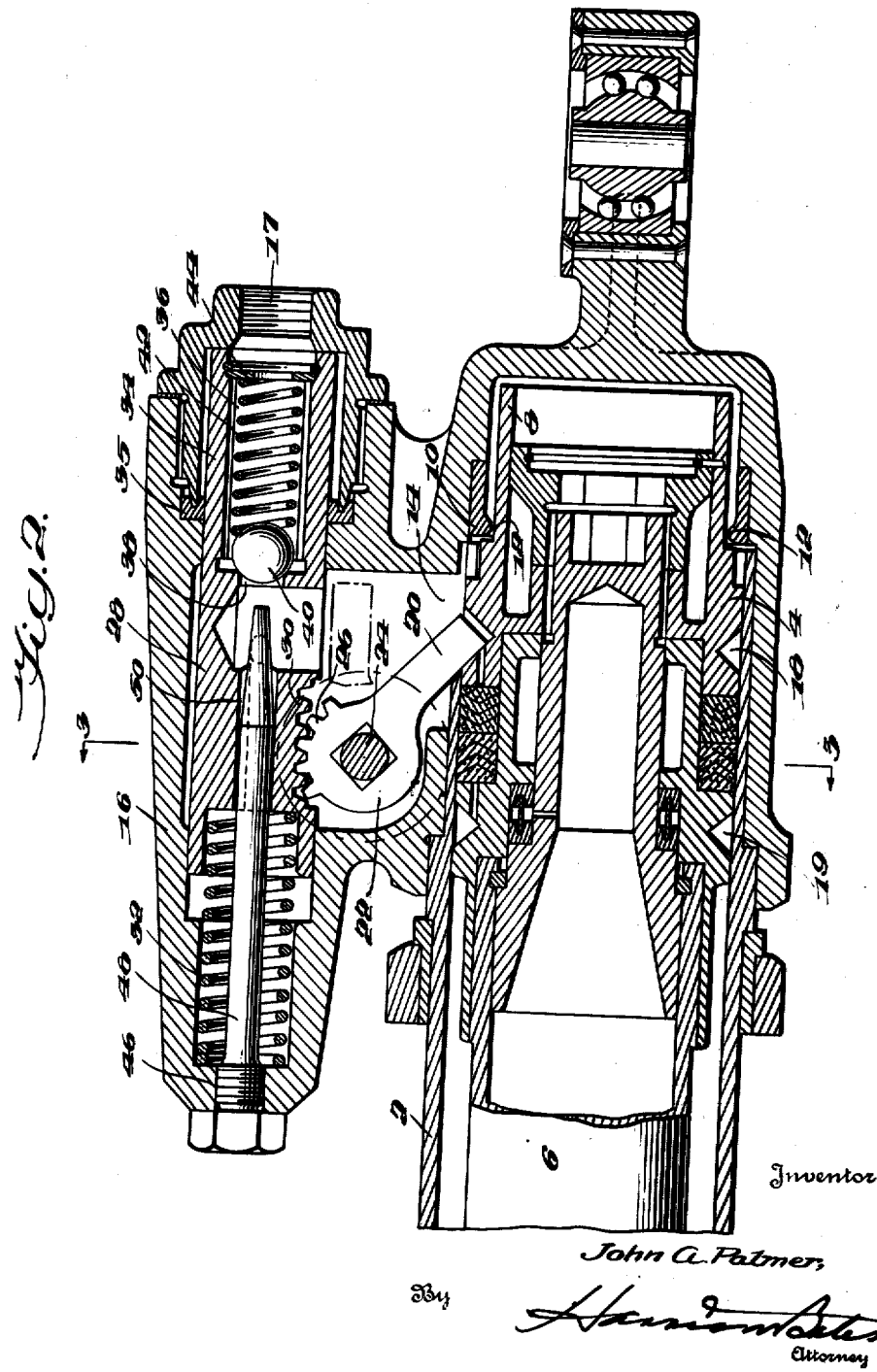

Patented July 22, 1941

2,249,850

UNITED STATES PATENT OFFICE 2,249,850

FLUID PRESSURE CYLINDER LOCKING MECHANISM

John A. Palmer, Baltimore, Md., assignor to The Glenn L. Martin Company, Baltimore, Md.

Application June 18, 1940, Serial No. 341,105

7 Claims. (Cl. 121—40)

The invention relates to fluid pressure cylinder and piston arrangements and particularly to locking mechanism therefor.

Hydraulic cylinder mechanisms are used for actuating many types of mechanisms. Such cylinder mechanisms are under some circumstances likely to undergo movement even when pressure fluid is not supplied to them.

The primary object of the present invention is to provide a hydraulic cylinder mechanism which will prevent movement of the piston from either extreme position in the cylinder unless fluid pressure is supplied thereto.

Another object of the invention is to provide a mechanism of this type which does not permit access of pressure fluid to the cylinder until the locking mechanism has been released.

Further objects and advantages will appear more fully from the following description, particularly when taken in conjunction with the accompanying drawings which form a part thereof.

In the drawings:

Fig. 1 is a side elevation, partly in section, of a hydraulic mechanism embodying the invention;

Fig. 2 is a longitudinal section through the head end of the hydraulic cylinder mechanism of Fig. 1;

Fig. 3 is a cross-section principally on the line 3—3 of Fig. 2.

The invention in the form shown is applied to a hydraulic cylinder 2 having slidable therein a piston 4 with a piston rod 6. The head end only of the cylinder is shown in detail in Fig. 2. In the particular arrangement shown, damping means are provided for the head end of the piston stroke, composed of a projection 8 of the piston which moves into an annular projection 10 leaving only a slight space 12 therebetween. Pressure fluid enters the cylinder through an opening 14 in one side thereof and flows through space 12 to act on the face of the piston.

Opening 14 communicates with the interior of a casing 16 mounted on one side of the cylinder, one of these casings being provided at each end of the cylinder. This casing has an inlet at 17 to which a source of pressure fluid may be connected. The locking mechanism is arranged in this casing.

Piston 4 is provided on its periphery with annular V-shaped grooves 18, 19. These grooves may be engaged, in the manner shown, by locking arms 20 of latch members 22 mounted to turn on pivots 24 in the two casings 16, so as to lock the piston at each end of its movement. Latch member 22 is provided with an arcuate rack portion 26 concentric with pivot 24.

Slidable in the casing 16 is a block 28 having a rack portion 30 meshing with rack 26. This block is urged in a direction to move locking arms 20 into engagement with notch 18, or 19, as the case may be, (to the right in Fig. 2) by a coil spring 32 arranged between casing 16 and block 28.

Block 28 has at the opposite end, near inlet 17, a piston portion 34 sliding with a tight fit by packing 35 in casing 16. Portion 34 is provided with a bore 36 communicating at one end with inlet 17, and at the other end by opening 38 with the interior of casing 16. Opening 38 is normally closed by a ball valve 40 within bore 36 pressed on its seat by a coil spring 42 which at its other end rests on a spider 44 in the mouth of bore 36.

Secured by a threaded joint 46 in the casing 16 at the end opposite inlet 17 is a pin 48 which extends through a bore 50 in block 28 to a point adjacent to and in alignment with opening 38 and ball 40.

The operation of this mechanism is as follows: Normally the parts occupy the position shown in the drawings. Piston 4 cannot then move outwardly (or to the left, Fig. 2) because of the engagement of the end of locking arm 20 with the wall of groove 18.

If fluid under pressure is admitted to inlet 17, it flows into bore 36 and against ball 40 which of course closes opening 38. The pressure causes the whole block 28 to move to the left, Fig. 2, against the spring 32. Racks 30, 26 upon this movement cause locking member 22 to turn counterclockwise (Fig. 2) and locking arm 20 disengages from groove 18, leaving the piston free to move in the cylinder.

As block 28 moves further to the left, pin 48 enters aperture 38 and finally ball 40 engages the end of the pin. This of course lifts the ball from its seat, and pressure fluid flows through opening 38, the interior of casing 16 and opening 14 to the hydraulic cylinder, where it engages the piston to push it to the left (Fig. 2).

When the supply of fluid under pressure ceases, spring 32 moves block 28 back to the right, returning locking arm 20 to its locking position. When the piston is returned to its original position, the fluid can displace ball valve 40 and escape from the cylinder. As the piston moves back, groove 18 comes opposite locking arm 20 which again engages in the groove, thus again locking the piston against movement.

Of course the left-hand or rod end of the mechanism of Fig. 1 operates in the same manner, latch 20 engaging in groove 19 when the piston is in extended position (dotted lines in Fig. 1) and locking the piston rod out until pressure fluid for moving the piston in is supplied to inlet 17.

Threaded connection 46 makes it possible to adjust the piston of pin 48, so that the time of opening of ball valve 40 can be varied.

While I have described herein one embodiment of my invention I wish it to be understood that I do not intend to limit myself thereby except within the scope of the appended claims.

I claim:

1. In combination with a fluid pressure cylinder having a piston movable therein, means to lock the piston against movement, fluid supply means connected to said cylinder, a one-way discharge valve normally closing said fluid supply means, and means operated by pressure fluid for releasing said locking means and thereafter opening said valve.

2. In combination with a fluid pressure cylinder having a piston movable therein, means to lock the piston against movement, fluid supply means connected to said cylinder, a slidable member in said fluid supply means, means urging said member in one direction, said member moving in the other direction under the pressure of fluid in said supply means, a one-way discharge valve normally closing said supply means, and means operated by movement of said member in said other direction for first releasing said locking means and thereafter opening said valve.

3. In combination with a fluid pressure cylinder having a piston movable therein, means to lock the piston against movement, fluid supply means connected to said cylinder, a slidable member in said fluid supply means, means urging said member in one direction, said member moving in the other direction under the pressure of fluid in said supply means, a valve movably mounted in said member normally closing said supply means, and means operated by movement of said member in said other direction for first releasing said locking means and thereafter opening said valve.

4. In combination with a fluid pressure cylinder having a piston movable therein, means to lock the piston against movement, fluid supply means connected to said cylinder, a slidable member in said fluid supply means, means urging said member in one direction, said member moving in the other direction under the pressure of fluid in said supply means, means movably mounted in said member normally closing said supply means, and means operated by movement of said member in said other direction for first releasing said locking means and thereafter opening said supply means, said last means including a fixed member engageable with said closing means during movement of said member to move said closing means with respect to said member.

5. In combination with a fluid pressure cylinder having a piston movable therein, means to lock the piston against movement, fluid supply means connected to said cylinder, a slidable member in said fluid supply means, means urging said member in one direction, said member having a bore therethrough, means to supply fluid through said bore to said cylinder, a valve in said bore normally closing said supply means, whereby supply of pressure fluid to said supply means moves said member, means operated by movement of said member to release said locking means, and a stationary element mounted in the path of movement of said member engageable with said valve to open said valve when said member has released said locking means.

6. In combination with a fluid pressure cylinder having a piston moveable therein, said piston having a recess therein, a locking member movable to engage in said recess to lock said piston against movement, fluid supply means connected to said cylinder, a one-way discharge valve normally closing said fluid supply means, and means operated by pressure fluid for releasing said locking member and thereafter opening said valve.

7. In combination with a fluid pressure cylinder having a piston movable therein, said piston having a recess therein, a locking element pivoted for movement into said recess, fluid supply means connected to said cylinder, a slidable member in said fluid means, means urging said member in one direction, said member having a bore therethrough, means to supply fluid through said bore to said cylinder, a valve in said bore normally closing said supply means, whereby supply of pressure fluid to said supply means moves said member, meshing gearing on said element and member whereby movement of said member in said other direction releases said locking element, and a stationary element mounted in the path of movement of said member engageable with said valve to open said valve when said member has released said locking means.

JOHN A. PALMER.